US010781989B2

(12) United States Patent
Shimano

(10) Patent No.: US 10,781,989 B2
(45) Date of Patent: Sep. 22, 2020

(54) DIFFRACTION LENS AND VEHICULAR LAMP USING SAME

(71) Applicant: MAXELL JOEI TECH CO., LTD., Kanagawa (JP)

(72) Inventor: Takeshi Shimano, Tokyo (JP)

(73) Assignee: MAXELL JOEI TECH CO., LTD., Kanagawa (JP)

( * ) Notice: Subject to any disclaimer, the term of this patent is extended or adjusted under 35 U.S.C. 154(b) by 0 days.

(21) Appl. No.: 16/327,220

(22) PCT Filed: Jan. 16, 2018

(86) PCT No.: PCT/JP2018/001059
§ 371 (c)(1),
(2) Date: Feb. 21, 2019

(87) PCT Pub. No.: WO2018/135500
PCT Pub. Date: Jul. 26, 2018

(65) Prior Publication Data
US 2019/0226655 A1 Jul. 25, 2019

(30) Foreign Application Priority Data
Jan. 17, 2017 (JP) ................................ 2017-005772

(51) Int. Cl.
*F21S 41/20* (2018.01)
*F21S 43/00* (2018.01)
(Continued)

(52) U.S. Cl.
CPC ............. *F21S 41/285* (2018.01); *F21S 41/00* (2018.01); *F21S 43/00* (2018.01); *F21S 45/00* (2018.01); *G02B 5/18* (2013.01)

(58) Field of Classification Search
CPC .................................................... F21S 41/275
See application file for complete search history.

(56) References Cited

U.S. PATENT DOCUMENTS 8,367,803 B2 * 2/2013 Liebmann ................ A61K 8/64 435/252.3
9,429,768 B2 * 8/2016 Zalevsky ............ G02B 5/1895
(Continued)

FOREIGN PATENT DOCUMENTS

JP 11-274646 A 10/1999
JP 11274646 A * 10/1999
(Continued)

OTHER PUBLICATIONS

Amber Czajkowski, Specifying an Aspheric Surface, Dec. 14, 2007, Wyant College of Optical Sciences, University of Arizona (Year: 2007).*
(Continued)

*Primary Examiner* — Evan P Dzierzynski
*Assistant Examiner* — Keith G. Delahoussaye
(74) *Attorney, Agent, or Firm* — Volpe and Koenig, P.C.

(57) ABSTRACT

The diffraction lens has an incident side and an exit side that are both convexly shaped, includes an exit diffraction plane that has an absolute value for the order of diffraction of 5 or greater and is disposed on the exit side, and is shaped such that the absolute value of a curvature at the surface apex of an envelope surface of the exit diffraction plane is smaller than the absolute value of a curvature at the surface apex of an incident surface, or the absolute value of the amount of sag in the direction of the optical axis at an outer periphery of the envelope surface of the exit diffraction plane is smaller than the maximum absolute value of the amount of sag in the direction of the optical axis at an outer periphery of the incident surface.

4 Claims, 13 Drawing Sheets

EXAMPLE 1

101 104 106 107 103 102 105 108

(51) Int. Cl.

| | |
|---|---|
| ***F21S 41/00*** | (2018.01) |
| ***F21S 45/00*** | (2018.01) |
| ***G02B 5/18*** | (2006.01) |

(56) References Cited

U.S. PATENT DOCUMENTS

| | | | | |
|---|---|---|---|---|
| 2004/0047269 | A1 | 3/2004 | Ikenaka et al. | |
| 2004/0246873 | A1 | 12/2004 | Maruyama et al. | |
| 2012/0057447 | A1* | 3/2012 | Nakagawa | G11B 7/1374 369/112.23 |
| 2013/0314777 | A1* | 11/2013 | Dohi | G02B 27/30 359/385 |
| 2015/0362643 | A1 | 12/2015 | Shimano et al. | |
| 2019/0086051 | A1* | 3/2019 | Motohashi | F21S 41/27 |

FOREIGN PATENT DOCUMENTS

| | | | |
|---|---|---|---|
| JP | 2004-247025 | A | 9/2004 |
| JP | 2005-018967 | A | 1/2005 |
| JP | 2006-053994 | A | 2/2006 |
| JP | 2008-181717 | A | 8/2008 |
| JP | 2013-168195 | A | 8/2013 |
| JP | 2016-001203 | A | 1/2016 |

OTHER PUBLICATIONS

International Search Report for PCT/JP2018/001059, dated Apr. 17, 2018.

* cited by examiner

FIG. 2

EXAMPLE 1 (DIFFRACTION LENS 101)

| | ITEM | UNIT | VALUE | REMARKS |
|---|---|---|---|---|
| 1 | DESIGNED CENTER WAVELENGTH | nm | 550 | |
| 2 | ORDER OF DIFFRACTION | | 40 | |
| 3 | MATERIAL | | ACRYLIC | |
| 4 | REFRACTIVE INDEX | | 1.494 | |
| 5 | AMOUNT OF SURFACE IRREGULARITY | μm | 46 | |
| 6 | CENTER THICKNESS | mm | 15 | RATIO TO FOCAL LENGTH =0.312 |
| 7 | MAXIMUM AMOUNT OF SAG IN INCIDENT SURFACE | mm | 6.128 | |
| 8 | AMOUNT OF SAG IN EXIT ENVELOPE SURFACE | mm | -2.928 | ABSOLUTE VALUE SMALLER THAN IN INCIDENT SURFACE |
| 9 | ON-AXIS CURVATURE OF INCIDENT SURFACE | 1/mm | 0.01198 | |
| 10 | ON-AXIS CURVATURE OF EXIT ENVELOPE SURFACE | 1/mm | -0.01294 | ABSOLUTE VALUE GREATER THAN OF INCIDENT SURFACE |
| 11 | MINIMUM EDGE THICKNESS | mm | 5.944 | RATIO TO CENTER THICKNESS =0.396 |
| 12 | COMPOSITE FOCAL LENGTH | mm | 48.075 | |
| 13 | APERTURE RADIUS | mm | 30.28 | |
| 14 | LENS POWER | D | 20.8 | |
| 15 | SECONDARY COEFFICIENT OF PHASE FUNCTION | rad | -1568 | |
| 16 | DIFFRACTION LENS POWER | D | 12.0 | RATIO TO TOTAL LENS POWER =0.576 |
| 17 | MINIMUM PITCH | μm | 90.4 | |

F I G. 7
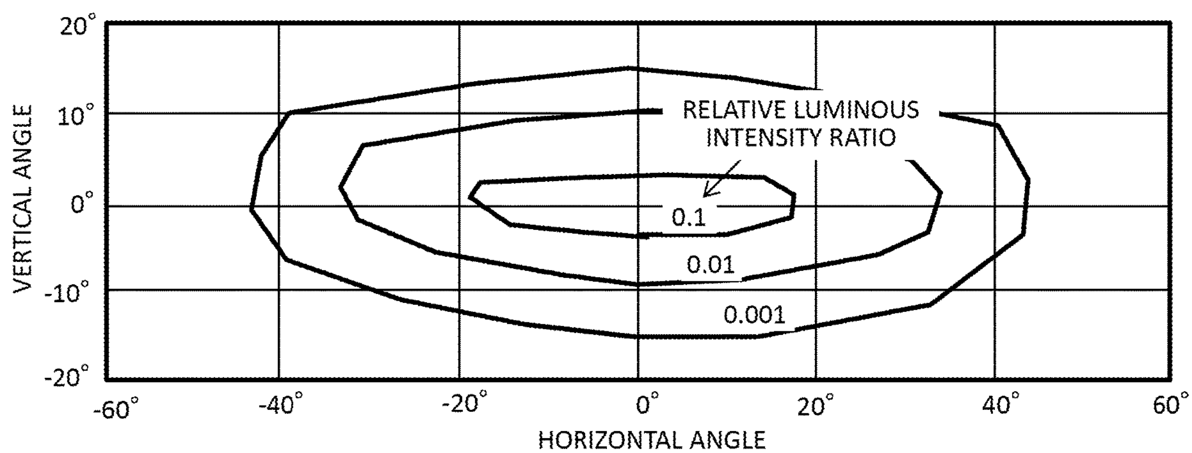

FIG. 9

EXAMPLE 2 (DIFFRACTION LENS 201)

| | ITEM | UNIT | VALUE | REMARKS |
|---|---|---|---|---|
| 1 | DESIGNED CENTER WAVELENGTH | nm | 550 | |
| 2 | ORDER OF DIFFRACTION | | 40 | |
| 3 | MATERIAL | | ACRYLIC | |
| 4 | REFRACTIVE INDEX | | 1.494 | |
| 5 | AMOUNT OF SURFACE IRREGULARITY | μm | 46 | |
| 6 | CENTER THICKNESS | mm | 15 | RATIO TO FOCAL LENGTH =0.307 |
| 7 | MAXIMUM AMOUNT OF SAG IN INCIDENT SURFACE | mm | 4.446 | |
| 8 | AMOUNT OF SAG IN EXIT ENVELOPE SURFACE | mm | -6.162 | ABSOLUTE VALUE GREATER THAN IN INCIDENT SURFACE |
| 9 | ON-AXIS CURVATURE OF INCIDENT SURFACE | 1/mm | 0.02453 | |
| 10 | ON-AXIS CURVATURE OF EXIT ENVELOPE SURFACE | 1/mm | -0.01537 | ABSOLUTE VALUE SMALLER THAN OF INCIDENT SURFACE |
| 11 | MINIMUM EDGE THICKNESS | mm | 4.392 | RATIO TO CENTER THICKNESS =0.293 |
| 12 | COMPOSITE FOCAL LENGTH | mm | 48.844 | |
| 13 | APERTURE RADIUS | mm | 30.28 | |
| 14 | LENS POWER | D | 20.47 | |
| 15 | SECONDARY COEFFICIENT OF PHASE FUNCTION | rad | -822.8 | |
| 16 | DIFFRACTION LENS POWER | D | 6.28 | RATIO TO TOTAL LENS POWER =0.307 |
| 17 | MINIMUM PITCH | μm | 84.6 | |

EXAMPLE 3

FIG. 11

EXAMPLE 3 (DIFFRACTION LENS 301)

| | ITEM | UNIT | VALUE | REMARKS |
|---|---|---|---|---|
| 1 | DESIGNED CENTER WAVELENGTH | nm | 550 | |
| 2 | ORDER OF DIFFRACTION | | 40 | |
| 3 | MATERIAL | | ACRYLIC | |
| 4 | REFRACTIVE INDEX | | 1.494 | |
| 5 | AMOUNT OF SURFACE IRREGULARITY | μm | 46 | |
| 6 | CENTER THICKNESS | mm | 15 | RATIO TO FOCAL LENGTH =0.312 |
| 7 | MAXIMUM AMOUNT OF SAG IN INCIDENT SURFACE | mm | 4.986 | |
| 8 | AMOUNT OF SAG IN EXIT ENVELOPE SURFACE | mm | -5.767 | ABSOLUTE VALUE GREATER THAN IN INCIDENT SURFACE |
| 9 | ON-AXIS CURVATURE OF INCIDENT SURFACE | 1/mm | 0.02662 | |
| 10 | ON-AXIS CURVATURE OF EXIT ENVELOPE SURFACE | 1/mm | -0.01143 | ABSOLUTE VALUE SMALLER THAN OF INCIDENT SURFACE |
| 11 | MINIMUM EDGE THICKNESS | mm | 4.247 | RATIO TO CENTER THICKNESS =0.283 |
| 12 | COMPOSITE FOCAL LENGTH | mm | 48.042 | |
| 13 | APERTURE RADIUS | mm | 30.28 | |
| 14 | LENS POWER | D | 20.82 | |
| 15 | SECONDARY COEFFICIENT OF PHASE FUNCTION | rad | -888.5 | |
| 16 | DIFFRACTION LENS POWER | D | 6.79 | RATIO TO TOTAL LENS POWER =0.326 |
| 17 | MINIMUM PITCH | μm | 84.6 | |

DIFFRACTION LENS AND VEHICULAR LAMP USING SAME

TECHNICAL FIELD

The present invention relates to a diffraction lens and a vehicular lamp using the diffraction lens.

BACKGROUND ART

A background art related to the present invention is disclosed in Patent Literature 1. According to a configuration disclosed in Patent Literature 1, a diffraction lens using high-order diffracted light is used as a camera or projector lens in order to reduce the thickness of the lens without sacrificing the optical performance of the lens. Further, Patent Literature 1 indicates that the diffraction lens is also applicable to a vehicular lamp.

Meanwhile, according to a configuration disclosed in Patent Literature 2, a Fresnel lens is used in order to reduce the overall length of a vehicular lamp. Further, according to a configuration disclosed in Patent Literature 3, a diffraction lens is used as an optical disk objective lens in order that the lens is shared by a plurality of wavelengths.

CITATION LIST

Patent Literature

PTL 1: Japanese Patent Application Laid-Open No. 2016-1203

PTL 2: Japanese Patent Application Laid-Open No. 2008-181717

PTL 3: Japanese Patent Application Laid-Open No. 2005-18967

SUMMARY OF INVENTION

Technical Problem

It is demanded that a lens used for a vehicular headlight be thin and able to form a proper image of a cut-off line during low-beam radiation.

The diffraction lens described in Patent Literature 1 is a meniscus lens (a lens having a concave surface and a convex surface having a greater curvature than the concave surface). Thus, the lattice plane of the diffraction lens is easily deformed by stress generated during a mold release and cooling process for molding. As a result, when the diffraction lens is used for a vehicular lamp, the cut-off line of a low beam may be improperly imaged (in terms of contrast).

The lens described in Patent Literature 2 is a vehicular lens. However, as a Fresnel lens is used as the vehicular lens, the cut-off line of a low beam may not be adequately imaged. Here, the Fresnel lens is obtained by dividing a uniform, continuous, curved lens surface into equal intervals radially from an optical axis into the plane or dividing the height of the surface into equal intervals in the direction of the optical axis, and reducing the thickness of the lens by cutting to uniform the height of the surface in the optical axis direction while maintaining the shape of the divided surface. Consequently, it is difficult to simultaneously satisfy the requirements on the shape of an envelope surface for acquiring desired lens characteristics and the requirements on a phase function for prescribing the lens power.

The lens described in Patent Literature 3 is not a vehicular lens, but is an optical disk lens. However, this lens is well known as a diffraction lens and has a function for forming an image of an information recording surface on a sensor. This diffraction lens uses first-order diffracted light in order for the use of laser light having a plurality of wavelengths. However, when this diffraction lens is used for white light of a vehicular headlight, a problem occurs due, for instance, to a decrease in diffraction efficiency or the generation of stray light from unnecessary high-order diffracted light.

An object of the present invention is to provide a highly-moldable, thin diffraction lens that is used for a vehicular lamp using a white light source and capable of properly forming an image of a cut-off line of a low beam.

Solution to Problem

According to an aspect of the present invention, there is provided a diffraction lens. A light beam incident side and exit side of the diffraction lens are both convexly shaped. An exit diffraction plane having an absolute value for the order of diffraction of 5 or greater is disposed on the exit side. The diffraction lens is shaped such that the absolute value of a curvature at the surface apex of an envelope surface of the exit diffraction plane is smaller than the absolute value of a curvature at the surface apex of an incident surface, or the absolute value of the amount of sag in the direction of the optical axis at an outer periphery of the envelope surface of the exit diffraction plane is smaller than the maximum absolute value of the amount of sag in the direction of the optical axis at an outer periphery of the incident surface.

Advantageous Effects of Invention

The present invention provides a highly-moldable, thin diffraction lens that is used for a vehicular lamp using a white light source and capable of properly forming an image of a cut-off line of a low beam.

BRIEF DESCRIPTION OF DRAWINGS

FIG. 2 is a diagram illustrating exemplary dimensional specifications for the diffraction lens.

FIG. 7 is a diagram illustrating the light distribution of a high beam provided by the diffraction lens according to Example 1.

FIG. 9 is a diagram illustrating exemplary dimensional specifications for the diffraction lens.

FIG. 11 is a diagram illustrating exemplary dimensional specifications for the diffraction lens.

DESCRIPTION OF EMBODIMENTS

Examples of the present invention will now be described with reference to the accompanying drawings. Examples 1 to 3 describe the shape of a diffraction lens that delivers suitable optical performance (light distribution) during low-beam radiation. Example 4 describes a configuration of a vehicular lamp that uses a diffraction lens.

Example 1

Figure 1:
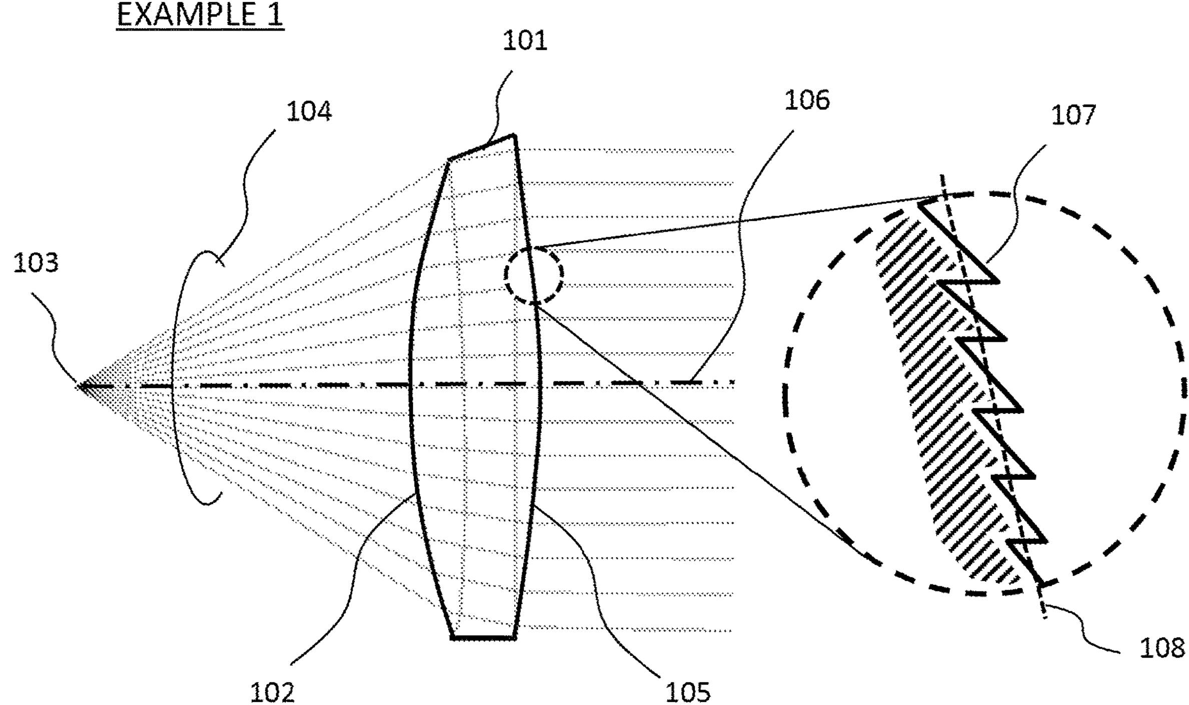
FIG. 1 is a side view illustrating the shape of a diffraction lens according to Example 1.

FIG. 1 is a side view illustrating the shape of a diffraction lens according to Example 1. FIG. 2 is a diagram illustrating, in tabular form, exemplary dimensional specifications for the diffraction lens.

Referring to FIG. 1, incident light beams 104 from a virtual light source 103 enter a left-side incident surface 102 of a diffraction lens 101, and exit from a right-side exit surface as substantially parallel light beams. As described later, a shade is disposed at the position of the virtual light source 103. The shade is a cover that forms a cut-off line during low-beam radiation from an automotive headlight. The shape of the diffraction lens 101 is designed such that an image of the shadow of an edge of the shade is formed at infinity (substantially at a location farther than a dozen meters away).

A zonal diffraction lens surface 107 (referred to also as the exit diffraction plane) is disposed on an exit surface 105 of the diffraction lens 101. The diffraction lens surface 107 has surface irregularity that is centered around an optical axis 106 and substantially parallel to the optical axis 106. The diffraction lens surface 107 is designed such that its comprehensive shape is defined by the shape of an envelope surface 108 along the central position of the surface irregularity, and that a predetermined optical path difference is given to a light beam transmitted through zonal bands on both sides divided by the surface irregularity.

As indicated in FIG. 2, Example 1 is configured such that 40th-order diffracted light (high-order diffracted light) achieves a diffraction efficiency of approximately 100% at a designed center wavelength of 550 nm. A condition for such diffraction is given such that the optical path difference of vertical incident light is $(n-1)d$ where n is a refractive index and d is the surface irregularity. The diffraction condition is satisfied when the optical path difference is 40 times the wavelength. More specifically, as acrylic resin having a refractive index of 1.494 at the abovementioned center wavelength is used as a lens material, the above diffraction efficiency is achievable when the surface irregularity d is approximately 46 μm. As the surface irregularity for providing the above optical path difference varies in the case of an oblique incident light beam, the amount of surface irregularity is actually larger than approximately 46 μm in an outer peripheral region where there are many oblique incident light beams.

The relationship expressed by Equation 1 is established between an incidence angle and exit angle of the diffraction lens surface 107 when the lattice pitch is p, the incidence angle of an incident light beam with respect to the envelope surface 108 is θ1, the wavelength is λ, the exit angle of Nth-order diffracted light is θ2, the refractive index of an incident space is n1, and the refractive index of an exit space is n2.

$$n_1 \sin\theta_1 - n_2 \sin\theta_2 = \frac{N\lambda}{p} \quad \text{Equation 1}$$

As is obvious from Equation 1, the exit angle of zeroth-order light with respect to the envelope surface conforms to the law of refraction (Snell's law), and the exit angles of subsequent orders are determined at substantially equal angle intervals. However, the diffraction lens according to the present example is of a so-called blazed lattice type. Therefore, when an adopted lattice shape has a depth such that the above optical path difference at the frequency of a designed order is obtained at a predetermined incidence angle, energy can be concentrated at a predetermined order.

In order to operate a diffraction plane as a lens in the above instance, the lattice pitch p of the diffraction lens surface is not a fixed value, but needs to be gradually decreased toward an outer periphery. When such a design is to be made, the distribution of optical path difference added by the diffraction plane is usually expressed as a phase function, and the value of its coefficient is optimized by optical design software for determination purposes. When a normalized radius obtained by normalizing the pupil radial coordinates of the lens with an effective radius R is ρ, the phase function ϕ(ρ) is generally expressed by Equation 2.

$$\phi(\rho)=\alpha_0+\alpha_2\rho^2+\alpha_4\rho^4+\ldots \quad \text{Equation 2}$$

In the above instance, α0, α2, and α4 are zeroth-order, second-order, and fourth-order coefficients of the phase function, respectively. These values are used to determine the radial position of a zonal band boundary of the diffraction lens.

Figure 3:
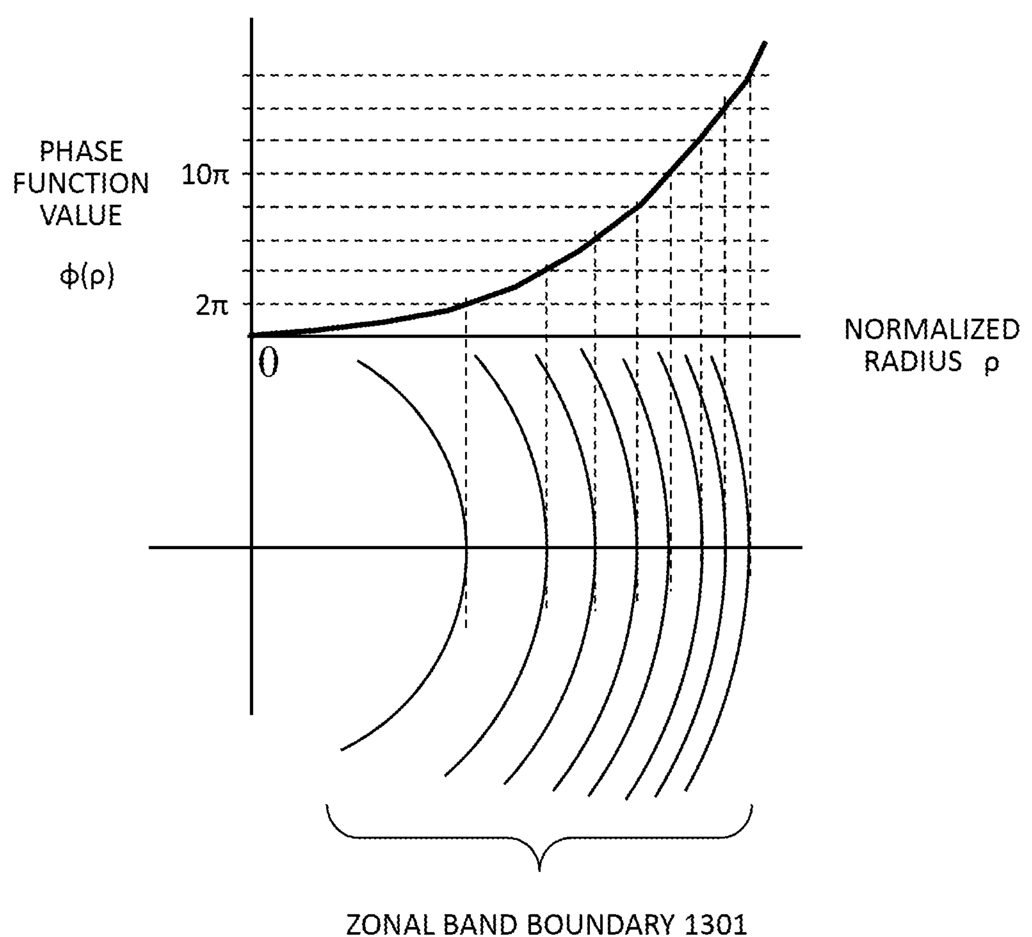
FIG. 3 is a diagram illustrating a method of calculating the radial position of a zonal band boundary.

FIG. 3 is a diagram illustrating a method of calculating the radial position of the zonal band boundary. The horizontal axis of a graph in FIG. 3 represents the normalized radius p, and the vertical axis represents the value of the phase function ϕ(ρ). At each radial position where the phase function value is an integer multiple of 2π, the radial position of its zonal band boundary 1301 is determined. In this instance, as indicated in Equation 4, the lattice pitch p of the diffraction lens is determined from a condition (Equation 3) in which a phase change determined by multiplying a local slope at a radius p where the phase function is positioned is 2Nπ.

$$\frac{p(r)}{R}\frac{d}{d\rho}\phi(\rho) = 2N\pi \quad \text{Equation 3}$$

$$p(r) = \frac{N\pi R}{\alpha_2\left(\frac{r}{R}\right) + 2\alpha_4\left(\frac{r}{R}\right)^3 + \ldots} \quad \text{Equation 4}$$

The lattice pitch p in the present example is 90.4 μm at the outermost periphery in accordance with the designed phase function.

According to design based on wave optics, in a case where high-order diffracted light is used as described above, the wavelength region generated by 40th-order diffracted light at practical diffraction efficiency is very narrow around 550 nm. However, neighboring orders of diffraction arise successively and alternately, that is, the 39th and 41st orders arise on both ends of the 40th order, and then the 38th and 42nd orders arise on both ends of the 39th and 41st orders. The resulting action is substantially equivalent to an action by which high diffraction efficiency is successively achieved in the entire visible light wavelength region. The diffraction angles of the neighboring orders of diffraction are close to the diffraction angle of designed wavelength, and give practically usable light without producing substantially unnecessary stray light.

Meanwhile, in the case of diffraction lens that uses first-order diffracted light described, for example, in Patent Literature 3, the wavelength range within which first-order diffracted light is obtained is wider than in the case of 40th-order diffracted light, but does not cover the entire visible light wavelength region. Therefore, in a wavelength region significantly deviated from the designed wavelength, not only the diffraction efficiency of the first-order diffracted light decreases, but also second-order diffracted light and zeroth-order diffracted light, which have a diffraction angle significantly different from that of first-order diffracted light, arise as unnecessary stray light. This problem is solved by using high-order diffracted light.

The boundary order between high-order diffraction lenses and low-order diffraction lenses varies with the degree of expected advantageous effects. However, conventional diffraction lenses using first-order diffracted light are mostly used within the limits of ±fifth order even in the case of an extended order. Consequently, a diffraction lens of an order greater than ±fifth order can be classified as a high-order diffraction lens that is intended by the present example. Therefore, it is expected that the above-described specific advantageous effects will be provided. Optical systems for use with white light are mostly designed such that the wavelength of green color, such as 550 nm, is adopted as the center wavelength. However, when approximately the fifth order of light diffraction is used at the center wavelength, a plurality of orders generally have a peak exhibiting the maximum diffraction efficiency within the visible light wavelength region. Consequently, using the fifth or higher order of diffraction creates a situation where at least a plurality of orders of diffracted light can be alternately used.

A light beam diffracted by a high-order diffraction lens as described above is actually equivalent to a light beam that is simply refracted by the surface of each zonal band of the diffraction lens surface 107. This lens action is close to the action of a Fresnel lens described, for example, in Patent Literature 2 rather than to the action of a diffraction lens when compared with a conventional diffraction lens that uses first-order diffracted light. However, the Fresnel lens is generally formed by dividing the distance of an original lens having a uniform surface from the optical axis into equal intervals in a plane perpendicular to the optical axis or dividing the amount of sag in a plane in the direction of the optical axis into equal intervals, sliding the divided planes in the direction of the optical axis, and arranging the divided planes in a substantially planar manner. Even if the above-mentioned surface of each zonal band is optimally shaped for performing a predetermined lens action before sliding, the sliding locally changes the thickness of the lens and deteriorates the performance of the lens.

Meanwhile, the high-order diffraction lens is capable of simultaneously optimizing the shape of the envelope surface, which acts as a base, and the phase function, which defines the lens power given by the diffraction lens, as is the case with a conventional diffraction lens that uses first-order diffracted light. That is to say, lens performance is assured because the shape can be designed so as to obtain a desired lens action in a state where a diffraction lens is prepared.

Although the high-order diffraction lens is described in Patent Literature 1, the high-order diffraction lens according to the present example has the following features.

(1) A first feature is that the diffraction lens surface 107 of high order (fifth or higher order) is disposed on the exit surface 105. In a case where the diffraction lens surface is disposed on the incident surface 102, light beams radiated at various angles from the virtual light source 103 are likely to be incident on a surface irregularity section of the diffraction lens surface 107. This incurs the generation of stray light. However, as the high-order diffraction lens surface 107 is disposed on the exit surface 105, the incident light beams 104 are incident on the exit surface 105 after they are refracted by the incident surface 102 into a state close to parallel light beams although they are not perfectly parallel light beams. Therefore, the light beams incident on the surface irregularity section decrease in amount so as to reduce the problem of stray light.

(2) A second feature is that the diffraction lens 101 is shaped like a biconvex lens. Although the diffraction lens described in Patent Literature 1 is a meniscus lens having a concave incident surface, such a shape is likely to deform the zonal band surface during a resin molding process. This makes it difficult to correct the shape of a mold. In view of these circumstances, the diffraction lens is substantially shaped like a biconvex lens. Further, as indicated in FIG. 2, the on-axis curvature at the surface apex of the incident surface is made positive, and the on-axis curvature at the surface apex of the envelope surface of the exit diffraction plane is made negative. In this instance, the sign of the curvature is positive when the center of curvature is positioned toward the direction of light beam propagation, and is negative when the center of curvature is positioned toward the light source. Further, the absolute value of the curvature is a reciprocal of the curvature radius.

(3) A third feature is that the absolute value of the amount of sag in the direction of the optical axis at a lens outer periphery of the envelope surface 108 of the exit diffraction plane 107 is smaller than the maximum absolute value of the amount of sag in the direction of the optical axis at a lens outer periphery of the incident surface 102, as indicated in FIG. 2. Here, the amount of sag is a geometrical surface shape amount indicating the amount of sag in the lens surface in the direction of the optical axis from the surface apex. The amount of sag in the direction of light beam propagation is expressed as positive, and the amount of sag in the direction toward the light source is expressed as negative. That is to say, it can be said that the amount of sag in the convex incident surface 102 gradually increases in positive direction from the surface apex to the periphery, and that the amount of sag in the convex exit surface 105 gradually increases in negative direction from the surface apex to the periphery. Here, the reason why the word "maximum" is added to the amount of sag in the incident surface is that the amount of sag in the outer periphery of an effective region of the incident surface varies with direction because the incident surface in the present example is a non-rotationally symmetric free-form curved surface. Eventually, the word "maximum" is added in order to use the maximum amount of sag in the incident surface.

As regards the curvature shape of the incident and exit surfaces, the absolute value of the curvature at the surface apex of the envelope surface 108 of the exit diffraction plane 107 is greater than the absolute value of the curvature at the surface apex of the incident surface 102. In general, lenses are shaped to have a substantially spherical surface so that the curvature usually increases with an increase in the amount of sag. In recent years, however, a resin-molded single lens excellent in image formation performance is generally shaped to have an aspheric surface. In this case, the amount of sag does not always correspond to the magnitude of on-axis curvature. Such correspondence does not exist in the case described in conjunction with the present example.

(4) A fourth feature is that the ratio of edge thickness to lens center thickness is set to 0.25 or higher but not higher than 0.5. Here, the center thickness is defined as an interval between the surface apex of the incident surface and the surface apex of the envelope surface of the exit diffraction plane, and the edge thickness is defined as an interval between the incident surface and the envelope surface of the exit diffraction plane at the radial position farthest from the optical axis in a lens effective region. In the present example, as indicated in FIG. 2, the center thickness is 15 mm and the edge thickness is 5.94 mm. Therefore, the ratio of the edge thickness to the center thickness is 0.396. A certain increase in the ratio of the edge thickness to the center thickness reduces the deformation of the zonal band surface of a diffraction lens by residual stress during resin molding. This improves the lens performance. However, an excessively high ratio of the edge thickness lengthens the resin molding time required for the entire lens and increases the cost of manufacture. In view of these circumstances, the range of edge thickness has lower and upper limits.

(5) A fifth feature is that the ratio of diffraction lens power to total lens power (the amount of contribution of diffraction lens surface 107) is set to 0.3 or higher but not higher than 0.6. Here, the lens power corresponds to the reciprocal of lens focal length. A lens having a focal length of 1 m is defined as 1 diopter (D). As the composite focal length including the lens power of the diffraction lens is 48.075 as indicated in FIG. 2, the total lens power is 20.8D. Meanwhile, the secondary coefficient α2 of the phase function of the diffraction lens is −1568 (rad). In this instance, the diffraction lens power $P_{diff}$ is given by Equation 5 when the lens radius is R, the designed wavelength is λ, and the order of diffraction is N.

$$P_{diff} = -\frac{N\alpha_2\lambda}{\pi R^2} \quad \text{Equation 5}$$

When N=40, λ=550 (nm), and R=30.28 (mm) are substituted into the above equation, the diffraction lens power $P_{diff}$ is 12.0 D. Thus, the ratio of the diffraction lens power to the total lens power is 0.576. When the ratio of diffraction lens power is high to a certain extent, it is possible to reduce the lens power to be provided by the curvature of the envelope surface 108 in order to obtain predetermined total lens power. As a result, the curvature of the lens decreases so that the surface becomes close to a planar surface. This increases the edge thickness and facilitates the design of decreased center thickness. However, if the ratio of diffraction lens power is excessively high, zonal band width decreases to make mold processing difficult. In view of these circumstances, the range of diffraction lens power has lower and upper limits.

(6) A sixth feature is that the ratio of center thickness to lens focal length is set to 0.2 or higher but not higher than 0.35. In the present example, as the focal length is 48.075 mm and the center thickness is 15 mm as mentioned earlier, the ratio of center thickness to the focal length is 0.312. Lenses used for conventional vehicular lamps have the same focal length and a center thickness of 20 mm or greater. Therefore, when the center thickness is set to approximately 15 mm in the present example, the center thickness is approximately 1/√(1.8). This reduces the lens molding time to approximately half. Therefore, when an upper limit of approximately 0.35 is imposed on the ratio in the present example with a certain margin allowed, the lens molding time can be substantially reduced to half. However, if the center thickness is unduly decreased, the diffraction lens power needs to be increased accordingly. This excessively decreases the zonal band width and makes mold processing difficult. In reality, therefore, the limit on thickness reduction is approximately 0.2.

Lens thickness reduction described above is achievable by applying the high-order diffraction lens according to the present example. Further, the range of the abovementioned ratio of center thickness to focal length is not based on simple design values, but is determined by indirectly defining the condition for delivering the performance of the high-order diffraction lens according to the present example.

Comparisons will now be made to determine whether the lenses described in the aforementioned three patent literatures satisfy the above six features according to the present example.

<Diffraction Lens According to Patent Literature 1>

First feature: Satisfied. A high-order diffraction lens surface is formed on the exit surface Second feature: Not satisfied. The incident surface is concaved.

Third feature: Not satisfied. The amount of sag is larger on the exit surface side than on the incident surface side.

Fourth feature: Not satisfied. The ratio of edge thickness to center thickness is as low as 0.2.

Fifth feature: Satisfied. The diffraction lens power is high due to the use of a high-order diffraction lens.

Sixth feature: Satisfied. The invention aims at reducing the lens thickness.

<Fresnel Lens According to Patent Literature 2>

First feature: (Satisfied.) As the adopted Fresnel lens is planar, it is conceivable that an action close to that of a high-order diffraction lens is performed.

Second feature: Not satisfied. The adopted Fresnel lens is flat and not a biconvex lens.

Third feature: Not satisfied. There is no sag (and no curvature).

Fourth feature: Not satisfied. As the adopted lens is flat, the edge thickness is equal to the center thickness.

Fifth feature: Not satisfied. It is conceivable that the lens power is entirely derived from a diffraction lens.

Sixth feature: Not satisfied. It can be read that the ratio of center thickness to focal length is approximately 0.1.

<Diffraction Lens According to Patent Literature 3>

First feature: Not satisfied. The adopted diffraction lens uses first-order diffracted light.

Second feature: Satisfied. The adopted diffraction lens is a biconvex lens.

Third feature: Not satisfied. The amount of sag is larger on the exit surface side than on the incident surface side.

Fourth feature: Satisfied. It can be read that the ratio of edge thickness to center thickness is approximately 0.3.

Fifth feature: Not satisfied. As first-order diffracted light is used, the diffraction lens power cannot be high, and the ratio to lens power is lower than 0.3.

Sixth feature: Not satisfied. It can be read that the ratio of center thickness to focal length is approximately 0.5.

The results of the above comparisons indicate that the third feature is not satisfied by any of the three patent literatures. The most essential feature of the present example is that the absolute value of the amount of sag in the direction of the optical axis at a lens outer periphery of the envelope surface of the exit diffraction plane is smaller than the maximum absolute value of the amount of sag in the direction of the optical axis at a lens outer periphery of the incident surface.

Advantageous effects of the present example will now be described. When the diffraction lens according to the present example is applied to a vehicular lamp, cut-off line image formation performance during low-beam radiation is sufficiently satisfactory. Before the explanation of the advantageous effects, cut-off line formation will be described.

Figure 4:
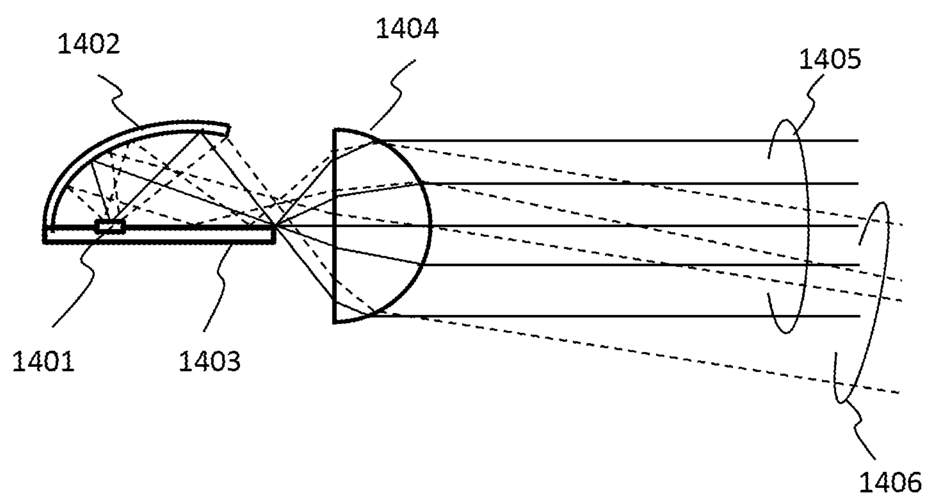
FIG. 4 is a diagram illustrating the principles of cut-off line formation during low-beam radiation.

FIG. 4 is a diagram illustrating the principles of cut-off line formation during low-beam radiation. Light radiated from an LED light source 1401 acting as a white light source is reflected from a reflector 1402 and collected in the vicinity of an edge of a shade 1403. This light collection is achievable when the reflector 1402 is substantially shaped like an ellipsoidal body, the LED light source 1401 is disposed near one focal point, and the edge of the shade 1403 is disposed at the other focal point. However, the LED light source 1401 is not a point light source, but has a certain size. Thus, light generated from a point away from a focal point is radiated toward a position deviated from the edge of the shade 1403. In such an instance, a light beam radiated toward the light source from the edge of the shade 1403 is reflected from the planar portion of the shade 1403, and a light beam radiated upward from the edge of the shade 1403 is not reflected. Both of these light beams are incident on a lens 1404. In this instance, when the focal position of the lens 1404 is disposed to coincide with the edge position of the shade 1403, light passing through a portion very close to the edge and reflected light are radiated forward as parallel light beams 1405 along the optical axis.

At a location several tens of meters forward from the lens 1404, which is sufficiently far as compared with a lens aperture, the distribution of radiated light is equal to the distribution of angles of light beams radiated from the lens 1404. Therefore, the light beams 1405 from the vicinity of the edge of the shade 1403 are radiated onto the cut-off line near the optical axis. Similarly, the edge of the shade 1403 is continuous in a direction perpendicular to the sheet of FIG. 4, and the light beams passing through the vicinity of such a trajectory are both radiated onto a substantially horizontal line along the cut-off line at the location several tens of meters forward from the lens 1404. This signifies that the shadow of the edge of the shade 1403 is uniformly projected onto a location several tens of meters forward. Consequently, an advantageous effect of blocking upward radiating light is provided.

Further, light beams passing through a location above the edge of the shade 1403 can be regarded as light beams that are both radiated from a location above the focal plane of the lens 1404, no matter whether they are reflected from the planar portion of the shade 1403. Therefore, such light beams are both radiated forward at a downward angle from the optical axis. These downward light beams 1406 (indicated by broken lines) irradiate an angular region below the cut-off line. The angular region positioned downward from the shade 1403 as viewed from the lens 1404 is the region of a shadow that the light beams from the reflector 1402 do not reach. Therefore, the region above the cut-off line, which is irradiated when the light beams from the aforementioned region exist, is blocked and darkened. In general, a projector-type low-beam headlight using a lens forms the cut-off line in the above-described manner.

When the cut-off line is set to be formed below the eyes of a driver of an oncoming vehicle passing a host vehicle, the minimum required field of view of the host vehicle can be irradiated without dazzling the driver of the oncoming vehicle. In the case of high-beam radiation, a region above the cut-off line can also be irradiated by removing the shade 1403 from an optical system.

Figure 5:
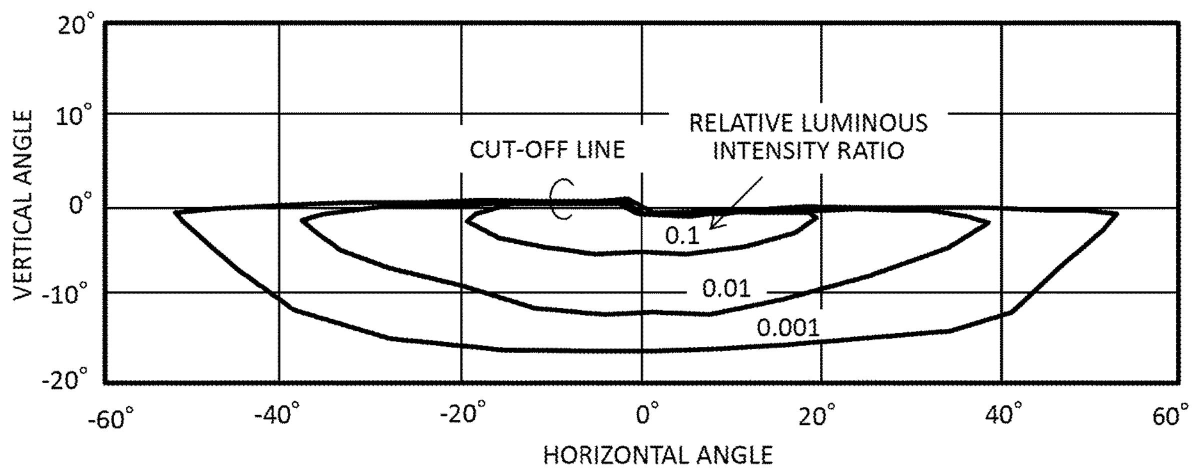
FIG. 5 is a diagram illustrating the reference characteristics of light distribution during low-beam radiation.

FIG. 5 is a diagram illustrating the reference characteristics of light distribution during low-beam radiation. The illustrated reference characteristics are derived when a conventional illumination lens (a non-diffraction lens having a thickness of 20 mm or greater) is used. Contour lines are used to indicate an angular range where relative luminous intensity, that is, the ratio to peak luminous intensity, is 0.1, 0.01, or 0.001. A line portion in which the three contour lines overlap with each other near the horizontal line in the vicinity of a vertical angle of 0 degrees is referred to as the cut-off line. As the contour lines overlap with each other, it is evident that the luminous intensity drastically decreases above the cut-off line. An object of the present example is to use a thinned lens in order to achieve light distribution characteristics that clearly form the cut-off line as indicated in FIG. 5.

Figure 6:
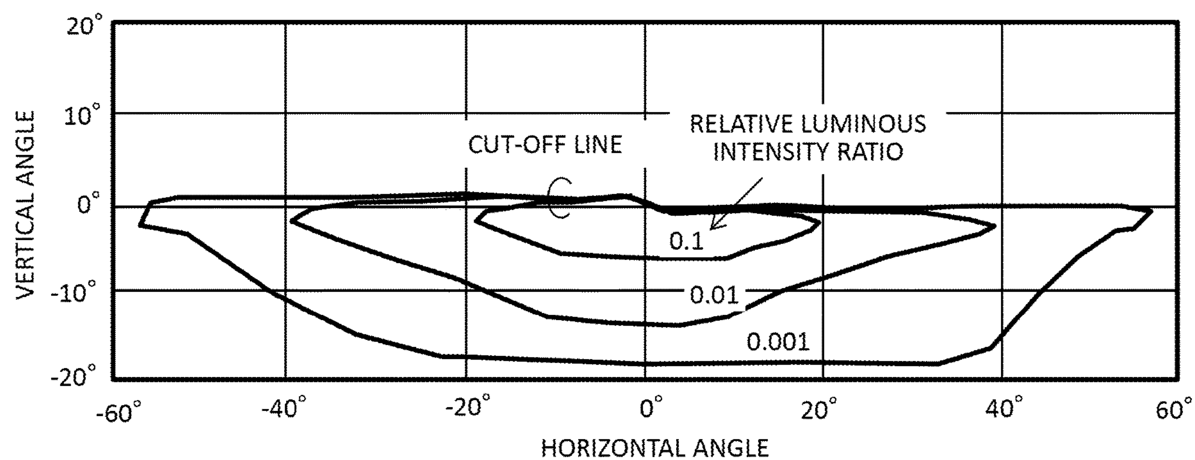
FIG. 6 is a diagram illustrating the light distribution of a low beam provided by the diffraction lens according to Example 1.

FIG. 6 is a diagram illustrating the light distribution of a low beam provided by the diffraction lens 101 according to the present example. It is found that the contrast of luminous intensity changes of the cut-off line is improved to form a horizontal cut-off line on both the left and right sides. That is to say, it is evident that the luminous intensity drastically decreases above the cut-off line, and that good performance equivalent to the performance of the cut-off line having the reference characteristics indicated in FIG. 5 is obtained. The cut-off line is bent in the vicinity of a horizontal angle of 0 degrees and lowered on the right side in order not to dazzle the driver of the oncoming vehicle coming from the front right of the host vehicle.

FIG. 7 is a diagram illustrating the light distribution of a high beam provided by the diffraction lens 101 according to the present example. The high beam is produced by removing the shade from the low-beam headlight. As the shade is removed, the cut-off line is not formed so that light is radiated upward as well.

The light distribution characteristics of a vehicular lamp are usually evaluated by using a screen positioned 25 meters forward. However, the range of evaluation is approximately ±60 degrees in the horizontal direction and approximately ±20 degrees in the vertical direction as indicated in FIGS. 5 to 7 so that the horizontal range of evaluation is significantly different from the vertical range of evaluation. Because of such evaluation anisotropy, at least either the incident surface or the exit surface of conventional lenses also adopts a non-rotationally symmetric shape.

The incident surface of the diffraction lens according to the present example is not rotationally symmetric with respect to the optical axis, but is formed of a free-form curved surface. However, the deviation from rotational symmetry (asymmetry) is neither significant nor apparently identifiable. Meanwhile, the diffraction lens surface 107 on the exit side in the present example is in a rotationally symmetric shape due to mold processing restrictions. Therefore, it is inevitably required that the incident surface be a non-rotationally symmetric free-form curved surface.

The diffraction lens according to the present example is not only excellent in cut-off line image formation performance during low-beam radiation, but also effective for suppressing a decrease in diffraction efficiency and the generation of diffracted light of unnecessary order. Further, the present example provides a thin lens having a lattice plane that is not significantly deformed during mold processing.

Example 2

Figure 8:
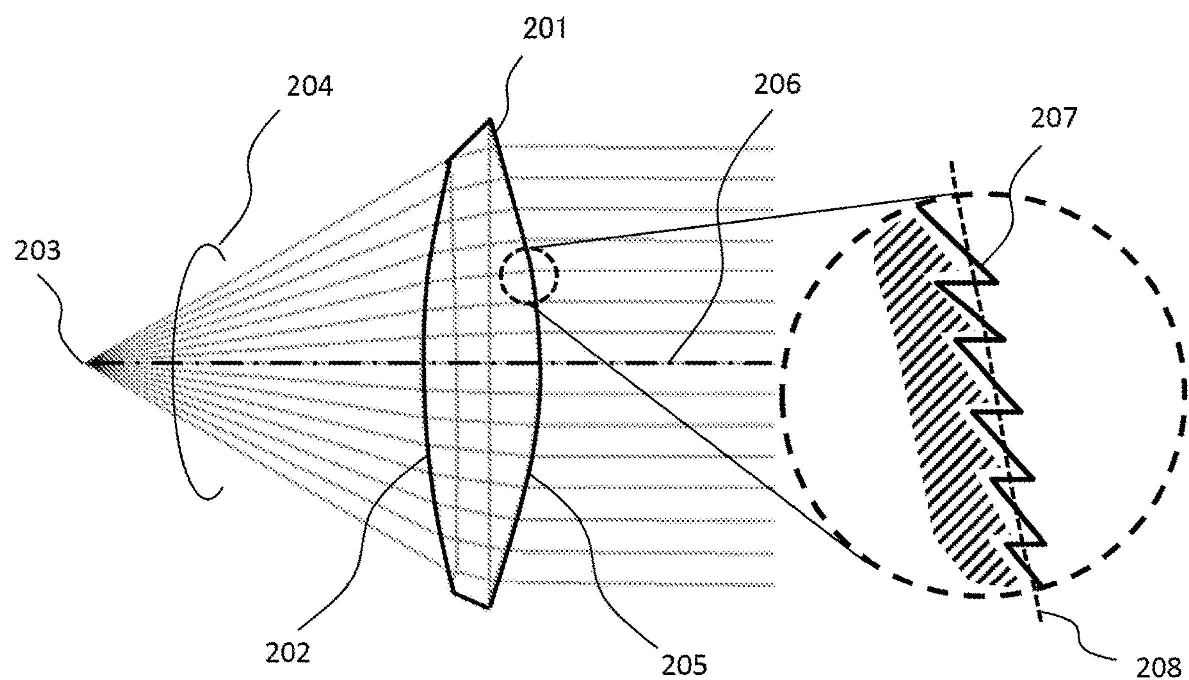
FIG. 8 is a side view illustrating the shape of the diffraction lens according to Example 2.

FIG. 8 is a diagram view illustrating the shape of the diffraction lens according to Example 2. The diagram in FIG. 9 illustrates, in tabular form, exemplary dimensional specifications for the diffraction lens.

As is the case with Example 1, the diffraction lens 201 emits incident light 204, which is incident from a virtual light source 203, as substantially parallel light beams. A high-order diffraction lens surface 207 is disposed on an exit surface 205 and shaped so as to generate 40th-order diffracted light at a designed center wavelength of 550 nm.

Referring to FIG. 9, the following description focuses on comparisons with the first to sixth features mentioned in conjunction with Example 1. First of all, the first and second features are both satisfied because the high-order diffraction lens surface 207 is disposed on the exit surface side and a biconvex lens shape is adopted.

As regards the third feature, the magnitude relationship concerning the amount of sag in Example 1 is not satisfied. Instead, the magnitude relationship concerning the curvatures of the incident surface and exit surface, which is similar to the third feature, is satisfied. That is to say, the absolute value of the curvature at the surface apex of an envelope surface 208 of an exit diffraction plane 207 is smaller than the absolute value of the curvature at the surface apex of an incident surface 202. As indicated in FIG. 9, the curvature at the surface apex is 0.0245 (curvature radius: 40.77 mm) for the incident surface and −0.0153 (curvature radius: −65.06 mm) for the envelope surface of the exit diffraction plane. Thus, the absolute value of the curvature on the exit surface side is smaller than on the incident surface side. Meanwhile, the absolute value of the amount of sag in the direction of the optical axis at a lens outer periphery is 4.446 mm on the incident surface side and 6.162 mm on the exit surface side. The absolute value for the exit surface is greater than for the incident surface. As described above, the third feature in Example 2 is expressed by the magnitude relationship concerning the curvatures of the incident surface and exit surface.

The fourth to sixth features are all satisfied. More specifically, as regards the fourth feature, the edge thickness is 4.39 mm while the center thickness is 15 mm. Thus, the ratio of edge thickness to center thickness is 0.293, which satisfies the range requirements, namely, 0.25 or higher but not higher than 0.5. As regards the fifth feature, the total lens power is 20.47 D, the secondary coefficient $\alpha 2$ of the phase function of diffraction plane is −822.8 (rad), and the lens power of diffraction plane is 6.28 D. Thus, the ratio of the diffraction lens power to the total power is 0.307, which satisfies the range requirements, namely, 0.3 or higher but not higher than 0.6. As regards the sixth feature, the ratio of center thickness to focal length is 0.307, which satisfies the range requirements, namely, 0.2 or higher but not higher than 0.35.

The diffraction lens 201 according to the present example also forms a cut-off line that is substantially similar to the one depicted in FIG. 6. Further, the image of the cut-off line is properly formed.

Example 3

Figure 10:
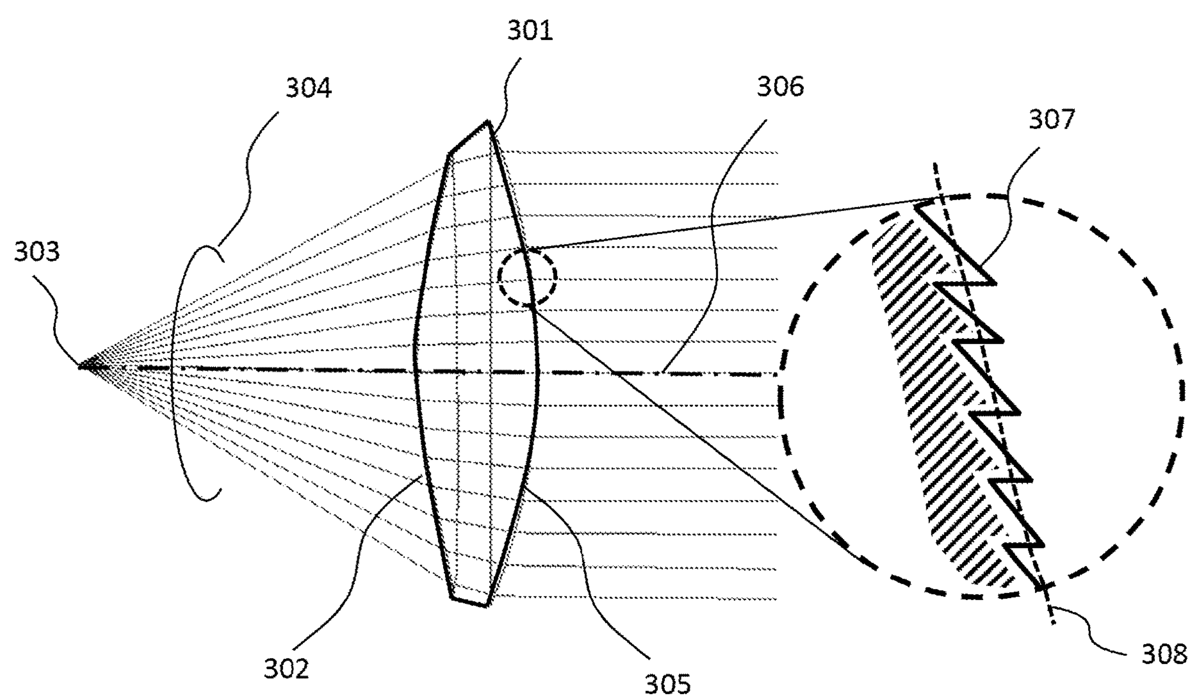
FIG. 10 is a side view illustrating the shape of the diffraction lens according to Example 3.

FIG. 10 is a side view illustrating the shape of the diffraction lens according to Example 3. FIG. 11 illustrates, in tabular form, exemplary dimensional specifications for the diffraction lens.

As is the case with Example 1 (FIG. 1) and Example 2 (FIG. 8), the diffraction lens 301 emits incident light 304, which is incident from a virtual light source 303, as substantially parallel light beams. A high-order diffraction lens surface 307 is disposed on an exit surface 305 and shaped so as to generate 40th-order diffracted light at a center wavelength of 550 nm.

The following description focuses on comparisons with the first to sixth features mentioned in conjunction with Example 1. First of all, the first and second features are both satisfied because the high-order diffraction lens surface 307 is disposed on the exit surface side and a biconvex lens shape is adopted.

As regards the third feature, the absolute value of the curvature at the surface apex of an envelope surface 308 for an exit diffraction plane 307 is smaller than the absolute value of the curvature at the surface apex of an incident surface 302, as is the case with Example 2. As indicated in FIG. 11, the curvature at the surface apex is 0.0266 (curvature radius: 37.57 mm) for the incident surface and −0.0114 (curvature radius: −87.48 mm) for the envelope surface of the exit diffraction plane. Thus, the absolute value of the curvature on the exit surface side is smaller than on the incident surface side. Meanwhile, the absolute value of the amount of sag in the direction of the optical axis at a lens outer periphery is 4.986 mm on the incident surface side and 5.767 mm on the exit surface side. The absolute value for the exit surface is slightly greater than for the incident surface so that visually observed difference in the amount of sag is subtle. Consequently, as regards the third feature, Example 3 is close to Example 2 in terms of a condition concerning the curvature magnitude relationship.

The fourth to sixth features are all satisfied. More specifically, as regards the fourth feature, the edge thickness is 4.25 mm while the center thickness is 15 mm. Thus, the ratio of edge thickness to center thickness is 0.283, which satisfies the range requirements, namely, 0.25 or higher but not higher than 0.5. As regards the fifth feature, the total lens power is 20.82 D, the secondary coefficient $\alpha 2$ of the phase function of diffraction plane is −888.5 (rad), and the lens power of diffraction plane is 6.79 D. Thus, the ratio of the diffraction lens power to the total power is 0.326, which satisfies the range requirements, namely, 0.3 or higher but not higher than 0.6. As regards the sixth feature, the ratio of center thickness to focal length is 0.312, which satisfies the range requirements, namely, 0.2 or higher but not higher than 0.35.

The diffraction lens 301 according to the present example also forms a cut-off line that is substantially similar to the one depicted in FIG. 6. Further, the image of the cut-off line is properly formed.

As is obvious from the above results described in conjunction with Examples 1 to 3, in order to assure the image formation performance of a vehicular lamp by using a high-order diffraction lens, it is important that the high-order diffraction lens is shaped to establish a predetermined magnitude relationship of the amount of sag or of the curvature between the incident surface and the exit surface. More specifically, it is found that either the absolute value of the amount of sag in the direction of the optical axis at the lens outer periphery of the envelope surface of the exit diffraction plane needs to be smaller than the maximum absolute value of the amount of sag in the direction of the optical axis at the lens outer periphery of the incident surface (the third feature of Example 1) or the absolute value of the curvature at the surface apex of the envelope surface of the exit diffraction plane needs to be smaller than the absolute value of the curvature at the surface apex of the incident surface (the third feature of Examples 2 and 3).

Figure 12:
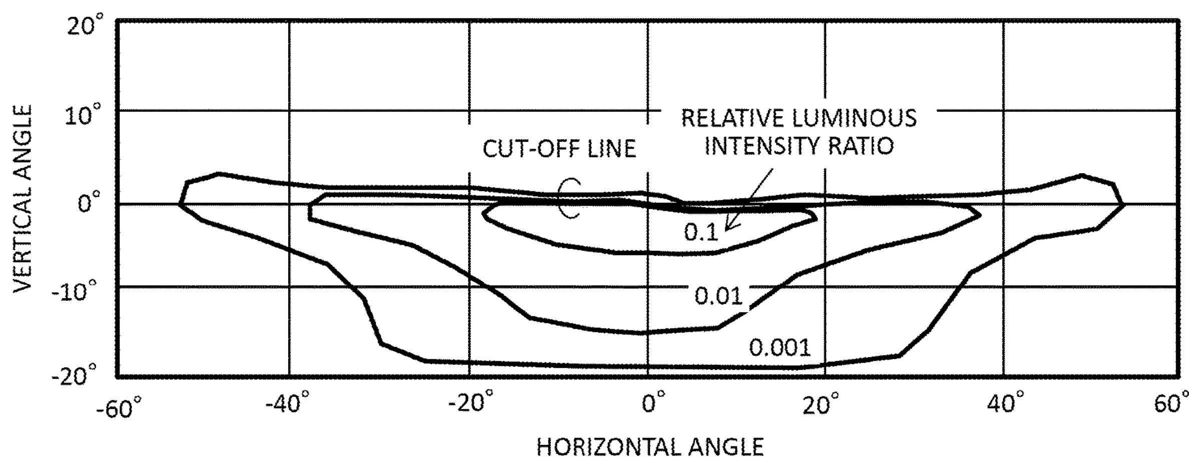
FIG. 12 is a diagram illustrating the light distribution of a diffraction lens noncompliant with a condition (third feature).

FIG. 12 is a diagram illustrating, for comparison purposes, the light distribution of a diffraction lens noncompliant with a condition (third feature). More specifically, FIG. 12 illustrates a case where the curvature on the exit surface side of the diffraction lens is greater than the curvature on the incident surface side and the amount of sag on the exit surface side is larger than the amount of sag on the incident surface side. It is evident that the cut-off line is blurred in the vicinity of the optical axis and curved in a region where the horizontal angle is large. This is a phenomenon unique to a case where a diffraction lens is thinned without being formed as a meniscus lens. Anyway, a possible reason is that the third feature mentioned above is not satisfied.

In the above respect, generally known lens characteristics are such that when, for example, the planar side of a plano-convex lens is oriented toward a point light source in a case where the plano-convex lens is used to form an image of the point light source as parallel light at infinity, the blur due to spherical aberration is reduced to exhibit high image formation performance. Thus, it can be expected that higher image formation performance is obtained when the curvature (or the amount of sag) on the exit surface side is greater than the curvature (or the amount of sag) on the incident surface side. However, the third feature of Examples 1 to 3 is contrary to such expectation. Such a result was not expected by the inventors of the present invention. It provides supporting evidence indicating that the present invention is worth patenting. A theoretical analysis has not been made to conclude that the center thickness can be decreased without sacrificing the image formation performance of a lens when the above condition (third feature) is satisfied. However, it is inferred that a contributing factor is the interrelationship between the overall shape of a lens and the disposition of a high-order diffraction plane.

Example 4

Example 4 will now be described with reference to a vehicular lamp that uses the diffraction lens described in conjunction with Examples 1 to 3.

Figure 13:
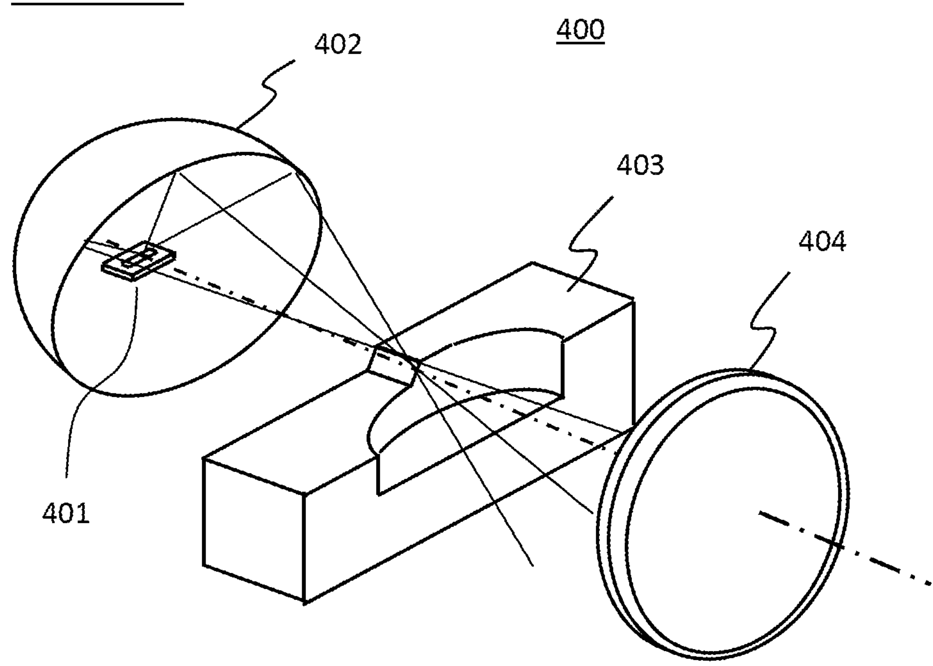
FIG. 13 is a diagram illustrating a configuration of a vehicular lamp according to Example 4.

FIG. 13 is a diagram illustrating a configuration of a vehicular lamp according to Example 4.

In the vehicular lighting deice, light radiated, for example, from an LED light source 401 acting as a white light source is reflected from an inner specular surface of a concave reflector 402, and collected by the concave reflector 402. A cover called a shade 403 is disposed in the vicinity of such a light collection position. The shade 403 is designed to reflect the light distribution (low beam) for distant radiation. The light transmitted through the shade 403 is radiated forward by a diffraction lens 404. The diffraction lens 404 has the same characteristics as the diffraction lenses 101, 201, 301 described in conjunction with Examples 1 to 3. When the shade 403 is curved so as to match the field curvature of the lens, the bright-dark boundary (cut-off line) of light distribution for radiation can be made sharper. High-beam radiation can be achieved by making the shade 403 movable and removing it from the optical path.

When the diffraction lens described in conjunction with Example 1, 2, or 3 is used, the vehicular lamp according to Example 4 is able to achieve low-beam radiation in a sufficiently satisfactory manner. Further, using a thin diffraction lens makes it possible to reduce the size of the vehicular lamp.

REFERENCE SIGNS LIST

101, 201, 301, 404 . . . diffraction lens,
102, 202, 302 . . . incident surface,
103, 203, 303 . . . virtual light source,
104, 204, 304 . . . incident light beam,
105, 205, 305 . . . exit surface,
106, 206, 306 . . . optical axis,
107, 207, 307 . . . diffraction lens surface (exit diffraction plane),
108, 208, 308 . . . envelope surface,
400 . . . vehicular lamp,
401 . . . LED light source,
402 . . . concave reflector,
403 . . . shade

The invention claimed is:

1. A vehicular lamp comprising:
a light source that radiates light;
a reflector that reflects and collects the light radiated from the light source;
a shade that blocks part of the light reflected and collected by the reflector; and
a diffraction lens that receives incident light transmitted through the shade and radiates the incident light forward of a vehicle;
wherein the diffraction lens has an incident side and an exit side that are both convexly shaped, includes an exit diffraction plane that has an absolute value for the order of diffraction of 5 or greater and is disposed on the exit side, and is adapted such that the absolute value of a curvature at the surface apex of an envelope surface of the exit diffraction plane is smaller than the absolute value of a curvature at the surface apex of an incident surface, or the absolute value of the amount of sag in the direction of the optical axis at an outer periphery of the envelope surface of the exit diffraction plane is smaller than the maximum absolute value of the amount of sag in the direction of the optical axis at an outer periphery of the incident surface.

2. A diffraction lens shaped such that an incident side and exit side of a light beam are both convexly shaped, the diffraction lens comprising:
an exit diffraction plane that has an absolute value for the order of diffraction of 5 or greater and is disposed on the exit side;
wherein the diffraction lens is shaped such that the absolute value of a curvature at the surface apex of an envelope surface of the exit diffraction plane is smaller than the absolute value of a curvature at the surface apex of an incident surface, or the absolute value of the amount of sag in the direction of the optical axis at an outer periphery of the envelope surface of the exit diffraction plane is smaller than the maximum absolute value of the amount of sag in the direction of the optical axis at an outer periphery of the incident surface, and
wherein the ratio of the surface interval of an outermost periphery of a lens effective region to the interval between the surface apex of the incident surface and the surface apex of the envelope surface of the exit diffraction plane is 0.25 or higher but not higher than 0.5.

3. The diffraction lens according to claim 2,
wherein the ratio of the lens power of the exit diffraction plane to the total lens power of the incident surface and exit diffraction plane is 0.3 or higher but not higher than 0.6.

4. The diffraction lens according to claim 2, wherein the ratio of the interval between the surface apex of the incident surface and the surface apex of the envelope surface of the exit diffraction plane to lens focal length is 0.2 or higher but not higher than 0.35.

* * * * *